Patented July 11, 1933

1,917,677

UNITED STATES PATENT OFFICE

HUGO WERTHEIM, OF VIENNA, AUSTRIA

PROCESS FOR PRODUCING BUTYL ALCOHOL AND ACETONE BY FERMENTATION

No Drawing. Application filed February 13, 1930, Serial No. 428,225, and in Austria February 23, 1929.

This invention relates to a process of producing butyl alcohol and acetone by the fermentation of carbohydrates.

After the discovery by Fernbach that butyl alcohol and acetone were obtained as main products together with smaller amounts of other alcohols in the course of the fermentation of carbohydrates or substances containing carbohydrates by organisms of the type of *B. butylicus Fitz* under anaerobic conditions, this process was rapidly developed in the United States of America until it attained great industrial importance. Both amylaceous and saccharine natural crude materials may be employed as starting products, since the organisms setting up bacterial butyl-acetonic fermentation are capable of easily degrading starch to monosaccharides by enzymatic action. Butyl alcohol and acetone have been formed in the fixed proportion of 2 to 1 from all organisms hitherto employed. The yield of "solvents" varies between 21% and 25% calculated on the dry mash. In addition thereto carbon-dioxide and hydrogen are obtained as gaseous fermentation products.

The development of this method of fermentation up to the state of the industry at the present time has been facilitated particularly by the discovery of the fact that in order to obtain uniformly vigorous fermentation, cultures must be employed at the start, which contain no vegetative forms of growth but consist exclusively of spores. Cultures are accordingly employed for inoculating purposes which have been heated to about 95° C. for a short time. It has moreover transpired that the acids produced by fermentation must not be neutralized with chalk. On the contrary in order that the fermentation should proceed along the correct lines it is essential that the acidity should from the start continuously increase until it reaches a maximum ("peak") and should thereafter decrease again continually until the completion of the fermentation. The fermentation curve constitutes an important method of controlling the operation; when the acidity decreases very slowly or does not even decrease at all, this is a sure sign that the mashes are infected or that the organism setting up fermentation itself is attenuated. The carbohydrate content of the mashes must be considerably below the concentrations which are permissible for alcoholic fermentation; the upper limit is defined by 8% starch. However, the viscosity of the mashes which are produced by steaming the starting materials under pressure, especially when maize meal is employed, is considerable, notwithstanding lower concentrations, and it has therefore been proposed to carry out this boiling under pressure with the addition of such limited amount of hydrochloric acid as is just sufficient to convert the diphosphates contained in the flour into monophosphates. Finally Fernbach has already recommended to add where necessary to the carbohydrate mash decomposed or partially degraded yeast to act as a nutritive substance. In addition to these more or less important proposals for the technical development of the process, there are to be found more particularly in patent specifications, data concerning various organisms to which specific properties have been ascribed suiting them for this process.

According to the present invention the main fermentation is allowed to proceed in mashes which are acidulated prior to the initiation of the fermentation by the addition of organic acids, more particularly lactic acid. No matter what particular organism suitable for carrying out the butyl-acetonic fermentation is employed, the prevention of contamination and normal course of the fermentation is by this means assured. As is known, organic acids act in admixture with their own salts (formed with strong bases), as buffers and thus prevent the hydrogen ion concentration from exceeding certain limits in spite of the increase of the acidity during the fermentation. This special action which is possessed by organic acids, together with the power of suppressing the danger of contaminated fermentation setting in, cannot be obtained by the addition of inorganic acids. The self regulating buffer action of the system, organic acids—salts of these acids with strong bases, is with advantage still further increased by the addition of killed or autolyzed yeast (known per se) or by the addition of other mixtures of substances with good buffer properties, which at the same time form nitrogeneous nutritive substances, such as albuminaceous mixtures of vegetable origin. In addition the admixture of ammonium compounds is recommended, particularly of ammonium salts or of urea or the like.

Instead of adding organic salts to the mash they can be produced in the mash by fermentation, thus for example, lactic acid may be produced by the lactic acid fermentation customary in the production of yeast.

The initial acidity of the mash (titrable acidity towards bromthymol blue) is preferably adjusted so as to amount to from 1.4 to 1.6 c. c. normal NaOH per 100 c. c. The pH value at the beginning of the fermentation should lie between 5 to 4.6, the degree $\pi$ to which the buffering is carried being at least 4.

The buffering index $\pi$ (to which Michaelis, Hydrogen Ion Concentration, 1926 edition, page 106, assigns the symbol $\sqrt{}$) is expressed mathematically by the equation $$\frac{dL}{dpH}.$$

The numerical value of the buffering is, as is known, determined by measuring the variations of the pH value occurring with the addition of a definite small amount of acid or alkali to a given amount of the culture medium. Theoretically, the additions should be infinitely small, but in practice the lower limit is set by the accuracy of the method of pH determination. In order to obtain comparable results, the amount of added acid or alkali must be constant in all the experiments. The $\pi$ values given below are based on the following known method of determination. Three test portions of the culture medium, each about 1 c. c., are taken out together. In one of these test portions the pH value is measured by the usual method. To the second test portion 0.5 c. c. of $$\frac{n}{100}$$

sulphuric acid solution, to the third 0.5 c. c. $n/100$ solution of caustic soda are added, whereupon the pH value is also determined in these two test portions by the same method as above. The changes in the pH value are indirectly proportional to the buffering value $\pi$.

Theoretically, the amount of these alterations should be of equal value, with opposite signs, but in practice, there are often considerable discrepancies between the changes of the pH value, which are produced by equivalent amounts of acids and alkalis. In the practical determination after having fixed the changes of pH towards the acid and alkaline sides the arithmetical mean of the reciprocal values is calculated and accepted as the value of $\pi$. For determining the pH value the known indicator-strip method of Dr. Peter Wulff (see German Patent No. 405,091) was employed.

It is recommended to supervise the course of the fermentation by periodically measuring the buffer index $\pi$ employing this method of determination in order to adapt the $\pi$ value to the change in the acidity so that said value increases with the acidity and preferably attains its maximum simultaneously with the maximum acidity. If the buffer index is found to be insufficiently high during the course of the main fermentation, then this is compensated by adding to the mash subsequently substances of high buffering power such as for example lactic acid, tartaric acid, citric acid or oxalic acid.

For carrying out the fermentation—as is generally usual—cultures containing spores exclusively are propagated in a plurality of batches of increasing volume, until finally a setting on portion of sufficient size for pitching the main mash will be built up.

Moreover mashes for fermentation on the large scale are prepared in the usual manner. The optimum concentration of starch or sugar amounts to 6 or 7%.

*Example*

100 litres of the mash are to contain about 35-37 kilos of potatoes or 9-10 kilos of maize meal. Other starchy materials are worked up into mashes of the same concentration (6-7% of pure starch) according to their content of starch. The potatoes are used in the whole form, the maize of the like in the form of meal, being introduced with a suitable quantity of water into an autoclave which is provided with agitating means, where they are steamed for about 1-2 hours under a pressure of 2-3 atmospheres. The nitrogenous nutrient substances serving at the same time as buffer (killed or autolyzed yeast, or malt sprouts in conjunction with urea or ammonium phosphate or ammonium sulphate, or similar nitrogenous substances in various combinations) are preferably added to the mash while in the autoclave. A typical suitable composition is for example per 100 litres of mash, 125 grams of killed or degraded yeast, 125 grams of malt sprouts and 40 grams of ammonium sulphate. The mash is blown directly into the fermentation tank which has been previously carefully sterilized and which is provided with agitating means, said tank being completely closed and provided with a top adapted to collect the liberated gas. After adjusting the suitable initial acidity to 1.4 to 1.6 c. c. normal NaOH per 100 c. c. for which purpose 80-90 c. c. of 80% lactic acid are preferably added to every 100 litres of the mash, the latter is then reduced to the fermentation temperature of 37-38°, for example, by cooling devices internally disposed in the vessel; however for this purpose the mash can also be caused to pass through heat-exchange apparatus. The mash shows now a pH value between 5 and 4.6 and a buffer-index of at least 4.

When the mash is ready for pitching a suitable quantity of the bacterial pitching material must also be ready for use. For this purpose for example a sterile carbohydrate mash is prepared somewhat in the same manner as the main mash and 100 cc. of this culture medium are inoculated with a spore culture of the species *B. amylobacter A. M. and Bredemann* (named "*Clostridium butyricum Prazmowski*" by the Society of American Bacteriologists) which culture has been provisionally empirically tested as to its capacity of producing butyl-acetonic fermentation, and this culture is left to develop at 37–38° C. under anaerobic conditions. The growth begins after about 48 hours and therewith the development of the oidium. After it has been ascertained that the culture is of unimpeachable character, it is used to inoculate about 2 litres of a similar sterilized mash and after about 24 hours is transferred to about 20 litres of a similar mash. After a further 24 hours have elapsed these 20 litres are introduced into a prepared mash having a volume of 200 to 300 litres which after a further 24 hours is transferred to the main mash which has been prepared in the meantime.

During the fermentation of the main mash in addition to the bacteriological examination and the control of the titrable acidity, the pH value and the buffer concentration are determined at least four times daily which leads under certain circumstances to the addition of further buffer substances. After fermentation has proceeded for about 30 to 32 hours, during which the fermenting mixture must be carefully stirred at intervals, the culminating point of the fermentation and therewith the maximum acidity ("peak") is reached.

After the fermentation is terminated the main products formed (butyl alcohol and acetone) are recovered as is customary by fractional distillation. The presence of small amounts of other alcohols does not render a separate recovery thereof economical.

The gases evolved during the fermentation, i. e. hydrogen and carbon dioxide, as well as the residues containing valuable feeding stuffs, can be utilized in the customary manner.

In the present process there is no need of using micro-organisms immunized in any way to the presence of acids, in spite of the fact that bacteria of the species *Amylobacter A. M. and Bredemann* which preferably have to be used with the present process, are extremely sensitive to acids. As is well known, preferably for each large scale fermentation a setting on portion is prepared, starting each time from spores of a laboratory culture. Consequently each culture is passed only once through the culture medium acidulated before initiating fermentation and may stand this without suffering much damage.

Nevertheless butyl-acetonic bacilli immunized to acid may be used with advantage. A process for carrying out the fermentation by means of bacteria of the species *Amylobacter A. M. and Bredemann* which have been habituated, by cultivation, to increasing amounts of acids, and a special method for cultivating such organisms particularly adapted for the process described and claimed in the present application, constitutes the subject matter of my copending application Serial No. 428,234 filed February 13, 1930. This process consists essentially in continuing to cultivate bacteria of the species *Amylobacter A. M. and Bredemann* on nutrient media with progressively increasing initial acidity, and without neutralizing the acid produced by the fermentation, until the organism has become acidproof to the desired extent, whilst between each two successive cultivations on such a nutrient medium there is interposed a fermentation in a neutral or alkaline medium, in which fermentation the acid formed is neutralized. The cultures have to be heated for a short time, in the usual way, prior to inoculation of the next habituating fermentation with higher initial acidity, in order to kill all the vegetative forms so that spores alone are subcultivated in the habituating fermentation.

The degree of acidity indicated in the following claims are based on a determination using bromthymol blue as indicator.

I claim:—

1. A process for the production of butyl alcohol and acetone by fermentation which comprises preparing a sterile carbohydrate mash, acidulating it before initiating fermentation, inoculating said mash with bacteria of the species *Amylobacter A. M. and Bredemann*, butyl-acetonic bacilli, permitting the fermentation to go to completion and recovering butyl alcohol and acetone from the fermented mash.

2. In a process as set forth in claim 1, the step consisting in that the titratable initial acidity determined with bromthymol blue as indicator is adjusted to 1.4 to 1.6 c. c. normal NaOH per 100 c.c.

3. A process for the production of butyl alcohol and acetone by fermentation which comprises preparing a sterile carbohydrate mash, adding buffering mixtures thereto, adjusting the pH value to 5 to 4.6 for a buffer index $\pi$ of at least 4, inoculating said mash with bacteria of the species *Amylobacter A. M. and Bredemann*, butyl-acetonic bacilli, permitting the fermentation to go to completion and recovering butyl alcohol and acetone from the fermented mash.

4. A process for the production of butyl alcohol and acetone by fermentation which comprises preparing a sterile carbohydrate mash acidulating the said mash up to an acidity of at least 1.4 to 1.6 c. c. normal NaOH per 100 c.c., adding buffering mixtures thereto to adjust the pH to a value between 5 and 4.6 for a buffer index of at least 4, inoculating said mash with bacteria of the species *Amylobacter A. M. and Bredemann*, butyl-acetonic bacilli, permitting the fermentation to go to completion and recovering butyl alcohol and acetone from the fermented mash.

5. A process for the production of butyl alcohol and acetone by fermentation, which comprises preparing a sterile carbohydrate mash, adjusting the hydrogen ion concentration of the said mash, by addition of a non-volatile organic acid, to a pH of less than 5, inoculating the said mash with butyl-acetonic bacteria of the species *Amylobacter A. M. and Bredemann*, permitting the fermentation to go to completion and recovering butyl alcohol and acetone from the fermented mash.

6. A process for the manufacture of butyl alcohol and acetone by fermentation which comprises preparing a sterile carbohydrate mash, adjusting the hydrogen ion concentration of the said mash, by addition of an organic acid, to a pH of less than 5, inoculating said mash with bacteria of the species *Amylobacter A. M. and Bredemann*, and fermenting the said mash to produce mainly butyl alcohol and acetone.

7. A process for the manufacture of butyl alcohol and acetone by fermentation which comprises preparing a sterile carbohydrate mash, adjusting the hydrogen ion concentration of the said mash, by addition of lactic acid, to a pH of less than 5, inoculating said mash with bacteria of the species *Amylobacter A. M. and Bredemann*, and fermenting the said mash to produce mainly butyl alcohol and acetone.

8. A process for the manufacture of butyl alcohol and acetone by fermentation which comprises preparing a sterile carbohydrate mash, adjusting the hydrogen ion concentration of the said mash, by fermentative generation of lactic acid, to a pH of less than 5, inoculating said mash with bacteria of the species *Amylobacter A. M. and Bredemann*, and fermenting the said mash to produce mainly butyl alcohol and acetone.

9. Process for the manufacture of butyl alcohol and acetone by fermentation which comprises preparing a sterile carbohydrate mash, acidulating it before initiating fermentation, adding buffering mixtures thereto, inoculating said mash with butyl-acetonic bacilli immunized, by previous cultivation, to the presence of acids, modifying in the course of the fermentation the buffer index, by further addition of buffering substances, so as to suit the changes in titratable acidity, permitting the fermentation to go to completion and recovering butyl alcohol and acetone from the fermented mash.

10. In a process as claimed in claim 9 the step which consists in modifying the pH value in the course of the fermentation to suit the variation in the titratable acidity in such a way as to attain its highest value with the maximum acidity.

11. A process for the manufacture of butyl alcohol and acetone by fermentation which comprises preparing a sterile carbohydrate mash, adjusting the hydrogen ion concentration of the said mash, by addition of an acid, to a pH of less than 5, inoculating said mash with bacteria of the species *Amylobacter A. M. and Bredemann*, and fermenting the said mash to produce mainly butyl alcohol and acetone.

12. Process for the manufacture of butyl alcohol and acetone by fermentation which comprises preparing a sterile carbohydrate mash, acidulating it before initiating fermentation, inoculating said mash with butyl-acetonic bacteria immunized, by previous cultivation, to the presence of acids, and fermenting the said mash to produce mainly butyl alcohol and acetone.

13. Process for the manufacture of butyl alcohol and acetone by fermentation which comprises preparing a sterile carbohydrate mash, adjusting the hydrogen ion concentration of the said mash, by addition of an acid, to a pH of less than 5, adding buffering mixtures thereto, inoculating said mash with butyl-acetonic bacilli immunized, by previous cultivation, to the presence of acids, modifying during fermentation the buffer index, by further addition of buffering substances, so as to suit the changes in the titratable acidity, permitting the fermentation to go to completion and recovering butyl alcohol and acetone from the fermented mash.

14. Process for the manufacture of butyl alcohol and acetone by fermentation which comprises preparing a sterile carbohydrate mash, adjusting the hydrogen ion concentration of the said mash, by addition of an acid, to a pH of less than 5, adding buffering mixtures thereto which serve at the same time as nitrogenous nutriment, inoculating said mash with butyl-acetonic bacilli immunized, by previous cultivation, to the presence of acids, modifying during fermentation the buffer index, by further addition of buffering substances, so as to suit the changes in the titratable acidity, permitting the fermentation to go to completion and recovering butyl alcohol and acetone from the fermented mash.

In testimony whereof I have affixed my signature.

HUGO WERTHEIM.